US012126874B2

(12) United States Patent
Xiao et al.

(10) Patent No.: US 12,126,874 B2
(45) Date of Patent: Oct. 22, 2024

(54) CONTENT ACQUISITION SYSTEM

(71) Applicant: ROKU, INC., San Jose, CA (US)

(72) Inventors: Fei Xiao, San Jose, CA (US); Abhishek Bambha, Burlingame, CA (US); Nam Vo, San Jose, CA (US); Pulkit Aggarwal, San Jose, CA (US); Rohit Mahto, San Jose, CA (US); Andrey Vlasenko, San Jose, CA (US); Rameen Mahdavi, San Jose, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 18/091,234

(22) Filed: Dec. 29, 2022

(65) Prior Publication Data

US 2024/0223869 A1   Jul. 4, 2024

(51) Int. Cl.
  *H04N 21/81* (2011.01)
  *G06Q 30/0241* (2023.01)
  *G06Q 30/0251* (2023.01)
  *H04N 21/25* (2011.01)
  *H04N 21/254* (2011.01)

(52) U.S. Cl.
  CPC ....... *H04N 21/812* (2013.01); *G06Q 30/0249* (2013.01); *G06Q 30/0254* (2013.01); *H04N 21/251* (2013.01); *H04N 21/2542* (2013.01)

(58) Field of Classification Search
  None
  See application file for complete search history.

(56) References Cited

U.S. PATENT DOCUMENTS

| | | | | |
|---|---|---|---|---|
| 8,170,913 | B1 * | 5/2012 | Baluja | H04N 21/812 705/14.43 |
| 9,992,523 | B1 * | 6/2018 | Chen | H04N 21/251 |
| 11,004,135 | B1 * | 5/2021 | Sandler | G06Q 30/0631 |
| 2003/0168014 | A1 * | 9/2003 | Aarts | A61D 17/00 119/14.02 |

(Continued)

OTHER PUBLICATIONS

Zhang, X., Qi, F., Hua, Z., & Yang, S. (Apr. 2020). Solving billion-scale knapsack problems. In Proceedings of The Web Conference 2020. 8 pages.

(Continued)

*Primary Examiner* — Timothy R Newlin
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for a content acquisition system to recommend for acquisition a subset of content items selected from a set of content items available for purchase in relation to a content recommendation system currently used in a media environment. The content acquisition system may include a content recommendation system simulator to estimate an impact function value for a potential subset of content items of the set of content items available for purchase based on the currently used content recommendation system. Afterwards, an acquisition recommender can recommend for acquisition a subset of content items based on an optimized objective function value calculated based on an optimization model while meeting one or more budget constraints.

20 Claims, 6 Drawing Sheets

(56) References Cited

U.S. PATENT DOCUMENTS

| | | | | |
|---|---|---|---|---|
| 2004/0113936 | A1* | 6/2004 | Dempski | H04L 65/612 |
| | | | | 715/738 |
| 2010/0061661 | A1* | 3/2010 | Kamimaeda | G06F 16/532 |
| | | | | 382/298 |
| 2013/0205339 | A1* | 8/2013 | Haberman | H04N 21/8456 |
| | | | | 725/35 |
| 2013/0238710 | A1* | 9/2013 | Meshulam | G06Q 30/0631 |
| | | | | 709/204 |
| 2014/0130076 | A1* | 5/2014 | Moore | H04N 21/25883 |
| | | | | 725/19 |
| 2014/0196081 | A1* | 7/2014 | Emans | H04N 21/2542 |
| | | | | 725/32 |
| 2015/0324356 | A1* | 11/2015 | Andres Gutierrez | |
| | | | | H04N 21/4668 |
| | | | | 707/734 |
| 2016/0316245 | A1* | 10/2016 | Hirsch | H04N 21/2668 |
| 2018/0108033 | A1* | 4/2018 | Choi | H04N 21/26241 |
| 2018/0108041 | A1* | 4/2018 | Kang | H04N 21/26233 |
| 2018/0192128 | A1* | 7/2018 | Manus | G06N 20/00 |
| 2020/0134663 | A1* | 4/2020 | Gao | G06Q 30/0249 |
| 2020/0211056 | A1* | 7/2020 | Thoman | H04N 21/2547 |
| 2020/0219139 | A1* | 7/2020 | Poolavari | H04N 21/2668 |
| 2021/0258621 | A1* | 8/2021 | Kliots Shapira | G11B 27/036 |
| 2022/0295154 | A1* | 9/2022 | Mo | H04N 21/26208 |

OTHER PUBLICATIONS

Genetic algorithm. Wikipedia. Last updated Mar. 28, 2024. Retrieved from https://en.wikipedia.org/wiki/Genetic_algorithm. 19 pages.

* cited by examiner

402 — Estimating, by a content recommendation system simulator, an impact function value for a potential subset of content items of a first set of content items, based on an impact function and event log data of a content recommendation system for a second set of content items currently available to the content recommendation system, wherein the content recommendation system simulator is configured to simulate an impact measured by the impact function value to the second set of content items when adding the potential subset of content items to the second set of content items 404 — Selecting for acquisition, by an acquisition recommender, a recommended subset of content items selected from the first set of content items, wherein the recommended subset of content items is selected among a group of potential subsets of content items of the first set of content items, the recommended subset of content items has an optimized objective function value among a group of objective function values corresponding to the group of potential subsets of content items, and wherein an objective function value for the potential subset of content items is calculated by an objective function based on the impact function value of the potential subset of content items and an optimization model while meeting one or more budget constraints for the first set of content items, where the impact function value is computed by operations at 402 iteratively or call operations at 402 at a component.

CONTENT ACQUISITION SYSTEM

BACKGROUND

Field

This disclosure is generally directed to identifying content for acquisition, and more particularly to content acquisition systems recommending content items for acquisition in a media system or a media environment.

Background

Traditionally, television (TV) offers viewers access to content, which may be TV content or multimedia content, via subscription to cable or satellite services or through over-the-air broadcasts. In general, content can be delivered from a content source device operated by a content provider to millions of viewers to be displayed by TV devices. TV content has been offered to the viewers in a linear way in which viewers can only consume the content and watch programs according to a broadcaster programming schedule.

With the advanced technology, TV content or multimedia content such as movies can be delivered via the Internet or other channels to various media devices in a live stream format without the involvement of cable or satellite service providers. For example, TV content or multimedia content delivered in such stream format can be provided by over-the-top television (OTT) or free ad-supported streaming (FAST) TV. With the content delivered in stream format, viewers can have many choices on what content items to watch. With millions of content items available in a media environment provided by a service provider, a content recommendation system is normally used to recommend content items to a viewer so that the viewer can watch content items selected among the recommend content items.

Accordingly, content items in the media environment available for recommendation to viewers can have a significant impact on viewer experience as well as business profit for the service provider. Viewer experience depends not only on the performance of the content recommendation system used to recommend the content items to the viewers, but also on the content items available in the media environment for recommendation. Therefore, it is important to have the right strategy to purchase the content items to be added into the media environment. Generally, content items can be purchased and added to a media environment based on various acquisition strategies. However, determining an impact of new content items on an existing content item portfolio of a media environment may be difficult for many reasons. Improvements for identifying content items for acquisition in a media system or a media environment are desired.

SUMMARY

Provided herein are system, apparatus, article of manufacture, method and/or computer program product embodiments, and/or combinations and sub-combinations thereof, for a content acquisition system to recommend for acquisition a subset of content items selected from a set of content items available for purchase in relation to a content recommendation system currently used in a media environment. The content recommendation system is used in the media environment to recommend content items to viewers. The content acquisition system, different from the content recommendation system, may include a content recommendation system simulator to estimate an impact function value for a potential subset of content items of the set of content items available for purchase based on the currently used content recommendation system. Afterwards, an acquisition recommender can recommend for acquisition a subset of content items based on an optimized objective function value calculated based on an optimization model while meeting one or more budget constraints.

In some embodiments, a content acquisition system can include a content recommendation system simulator and a content acquisition recommender, implemented by hardware or software components. The content acquisition system can receive a first set of content items for potential acquisition. The content recommendation system simulator can estimate an impact function value for a potential subset of content items of the first set of content items, based on an impact function and event log data of a content recommendation system for a second set of content items currently available to the content recommendation system. The content recommendation system simulator can simulate an impact measured by the impact function value to the second set of content items when adding the potential subset of content items to the second set of content items. The acquisition recommender can select for acquisition a recommended subset of content items selected from the first set of content items. The recommended subset of content items can be selected among a group of potential subsets of content items of the first set of content items. The recommended subset of content items has an optimized objective function value among a group of objective function values corresponding to the group of potential subsets of content items. An objective function value for the potential subset of content items can be calculated by an objective function based on the impact function value of the potential subset of content items and an optimization model while meeting one or more budget constraints for the first set of content items.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for a content acquisition system having a content acquisition recommender to recommend content items for acquisition in a media system or a media environment. The content acquisition system or content acquisition recommender can be a recommendation system to generate a recommendation of content items not in the media environment for acquisition to be added to the media environment based on impact of a new content item on an existing content portfolio of the media environment.

Different from linear TV program, when the content is delivered in stream format in a media environment, viewers can have many choices on what content items to watch. With millions of content items available in a media environment provided by a service provider, a content recommendation system is normally used to recommend content items to a viewer so that the viewer can watch content items selected among the recommend content items. A content recommendation system may be a recommendation system used to recommend content items existing in a media environment to a viewer for viewing based on the viewer's profile. Hence, even though both are a recommendation system, a content recommendation system is different from a content acquisition system or a content acquisition recommender.

A content recommendation system may play an important role in a media environment by recommending content items available in the media environment for each individual viewer. However, viewer experience depends not only on how well the content recommendation system can recommend content items to the viewers, but also on what content items are available in the media environment. Accordingly, it is important to acquire content items that can potentially increase the steaming time or reach of the media environment. Therefore, a content acquisition system can impact overall engagement, steaming time, reach, user demographics distribution, and revenue of a media environment. It is the objective of a content acquisition system to select content items not in the media environment for acquisition to optimize engagement, steaming time, reach, and long term revenue for a media environment.

Generally, new content items can be added to a content distribution ecosystem based on one or more acquisition strategies. A strategy for a content acquisition system may be based on optimization using a popularity of content items, such as buying the most popular content items. However, the performance of a set of content items, such as movies, may depend on many factors including the popularity of the movies, the size of viewer segment for the movies, and other similar content items already in the media environment. A classic strategy may formulate the acquisition optimization problem as 0-1 knapsack problem, under the assumption that the streaming time ST and reach R of a set of content items S is equal to the sum of the streaming time and reach of an individual item in the set, denoted as $ST(S)=\Sigma_{i \in S} ST(item_i)$, and $R(S)=\Sigma_{i \in S} R(item_i)$, where the reach R can be defined as the number of individual viewers having viewed the content item. With the above assumption, a content acquisition system can predict the streaming time and reach of individual content items and then solve the 0-1 knapsack problem with integer programming (IP) solver, or dynamic programming (DP).

However, there are several issues with the classic strategy for content acquisition. In reality, assumptions like $ST(S)=\tau_{i \in S} ST(item_i)$, and $R(S)=\Sigma_{i \in S} R(item_i)$ may not be true. For example, if content items to be acquired are all kids' animations, the streaming time ST and reach R of those content items will overlap with each other and the overall streaming time and reach of the entire set could be much less than the sum of individual content item's streaming and reach. It is difficult to predict aggregated streaming time and reach for each content item accurately, as the streaming time and reach depend not only on the content item's popularity, but also on how many viewers in the community like the item or the viewer's interest distribution, and how well the new content item ranked among existing content items in the media environment for each viewer. Moreover, it is even more difficult in predicting streaming time and reach for a set of content items accurately. It is hard to predict the incremental impact of the entire set of new content items when combining with existing content items in the media environment. If the new content items have too much overlap with existing content items in the media environment, adding the new content items could have much less incremental streaming time and reach than simply adding up the streaming time and reach of the new content items.

In some embodiments, a content recommendation system simulator is presented to estimate expected incremental streaming time and reach of a set of content items. The content recommendation system simulator can use event log data of the content recommendation system currently used in the media environment to simulate the viewer behavior when adding the new set of content items to the media environment. Additionally, the content recommendation system simulator can estimate reach and streaming time for different viewer demographics buckets such as different age groups. In addition, a content acquisition recommender can use an optimization model, such as optimization model using a genetic algorithm or an iterated set merging algorithm, to find a near-optimal solution with the help of content recommendation system simulator. The content acquisition recommender can determine a list of top content items with the highest estimated incremental streaming time and reach which could be used as final review candidates for the product side. The content recommendation system simulator can also estimate streaming time and reach on different demographics buckets such as different age buckets, which could used to determine how to distribute the acquired content items to the proper demographics buckets.

Figure 1:
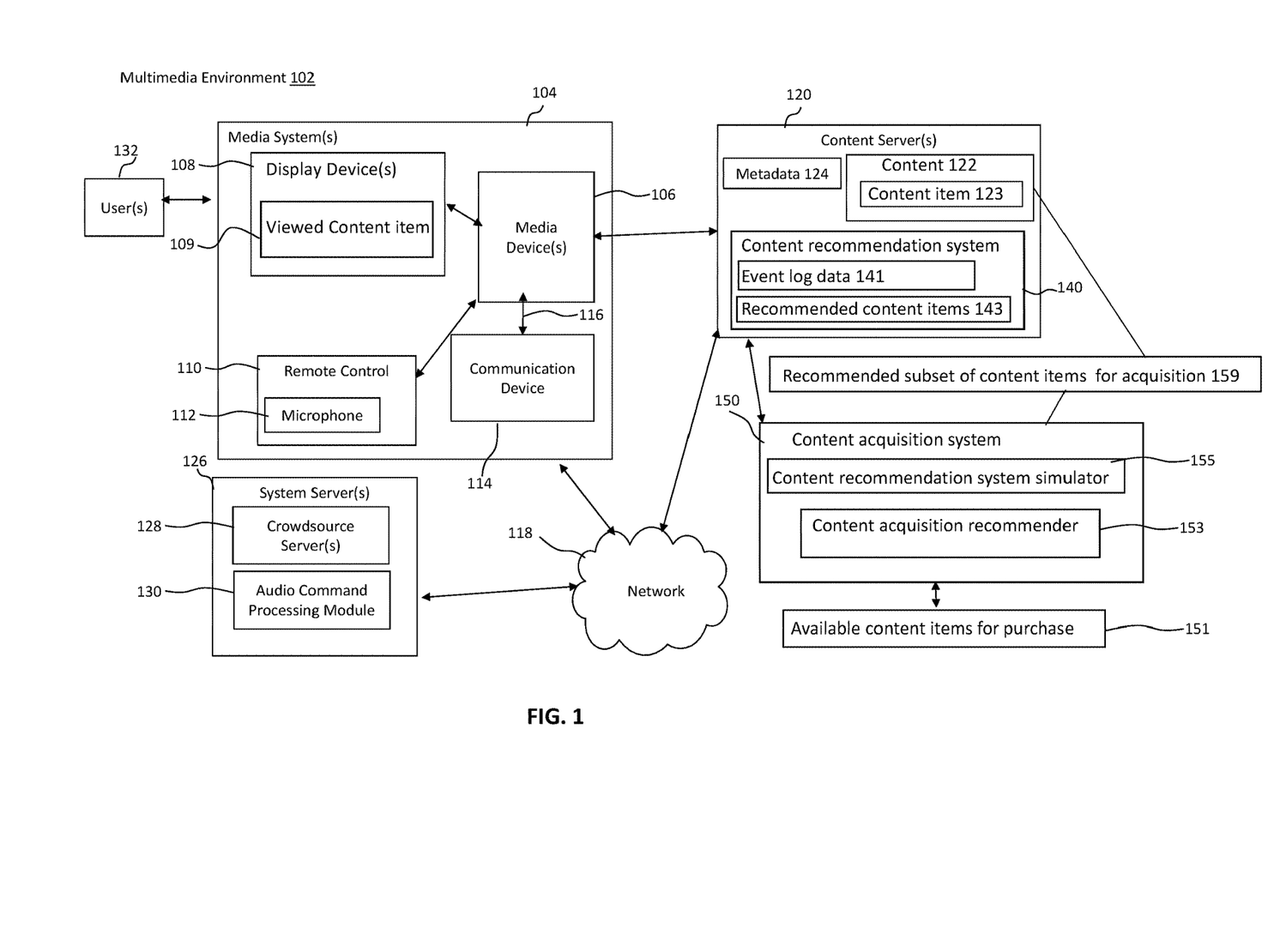
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102, may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content. User 132 can also be referred to as a viewer.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include content items 123, where a content item can be any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

In some embodiments, content server 120 may further implement a content recommendation system 140. Content recommendation system 140 can determine a set of recommended content items 143 selected from content 122, and recommend the set of recommended content items 143 to user 132. User 132 can further select a viewed content item 109 to be displayed on display device 108 for viewing. Content recommendation system 140 may determine the set of recommended content items 143 based on event log data 141, which can include various records of viewing history by user 132, such as the streaming time of user 132, content items being viewed by user 132, and any other performance indicators and record useful for making a recommendation.

In addition, using information received from the media devices 106 in the thousands and millions of media systems 104, content recommendation system 140 may identify viewing habits, for example, preferences or likes for different users 132 watching a particular movie. Such viewing habits may be included in event log data 141. Based on such information, recommendation system 140 may determine that users with similar watching habits may be interested in watching similar content.

In some embodiments, a content acquisition system 150 may be coupled to content server 120. Content acquisition system 150 can determine additional content items, which can be a recommended subset of content items for acquisition 159 to be purchased from a set of available content items for purchase 151. Recommended subset of content items for acquisition 159 can be purchased from content producers and added to content 122 saved on content server 120. Content acquisition system 150 can include a content recommendation system simulator 155 and a content acquisition recommender 153. For a potential subset of content items of the set of available content items for purchase 151, before making a decision to purchase the potential subset of content items, content recommendation system simulator 155 can estimate an impact function value for the potential subset of content items, based on event log data 141 of content recommendation system 140 for content items 123 currently available to content recommendation system 140. Content recommendation system simulator 155 can simulate an impact measured by an impact function value to content items 123 when adding the potential subset of content items to content items 123. In addition, content acquisition recommender 153 can select for acquisition recommended subset of content items for acquisition 159 selected from the set of available content items for purchase 151. The recommended subset of content items for acquisition 159 can be selected among a group of potential subsets of content items of the set of available content items for purchase 151, the recommended subset of content items for acquisition 159 can have an optimized objective function value among a group of objective function values corresponding to the group of potential subsets of content items.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The system servers 126 may also include an audio server (not shown). In some embodiments, the audio data received by the microphone 112 in the remote control 110 is transferred to the media device 106, which is then forwarded to the system servers 126 to process and analyze the received audio data to recognize the verbal command of user 132. The system servers 126 may then forward the verbal command back to the media device 106 for processing.

Figure 2:
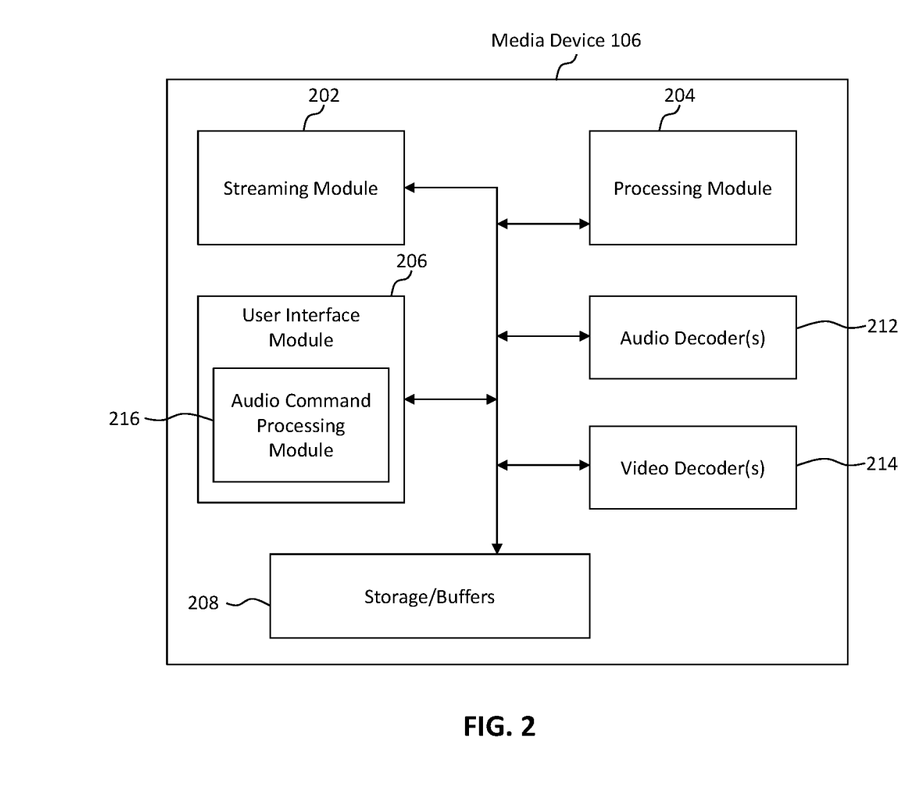
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 108 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OPla, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM, HD422, H.265, AV1, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Content Acquisition System

Figure 3:
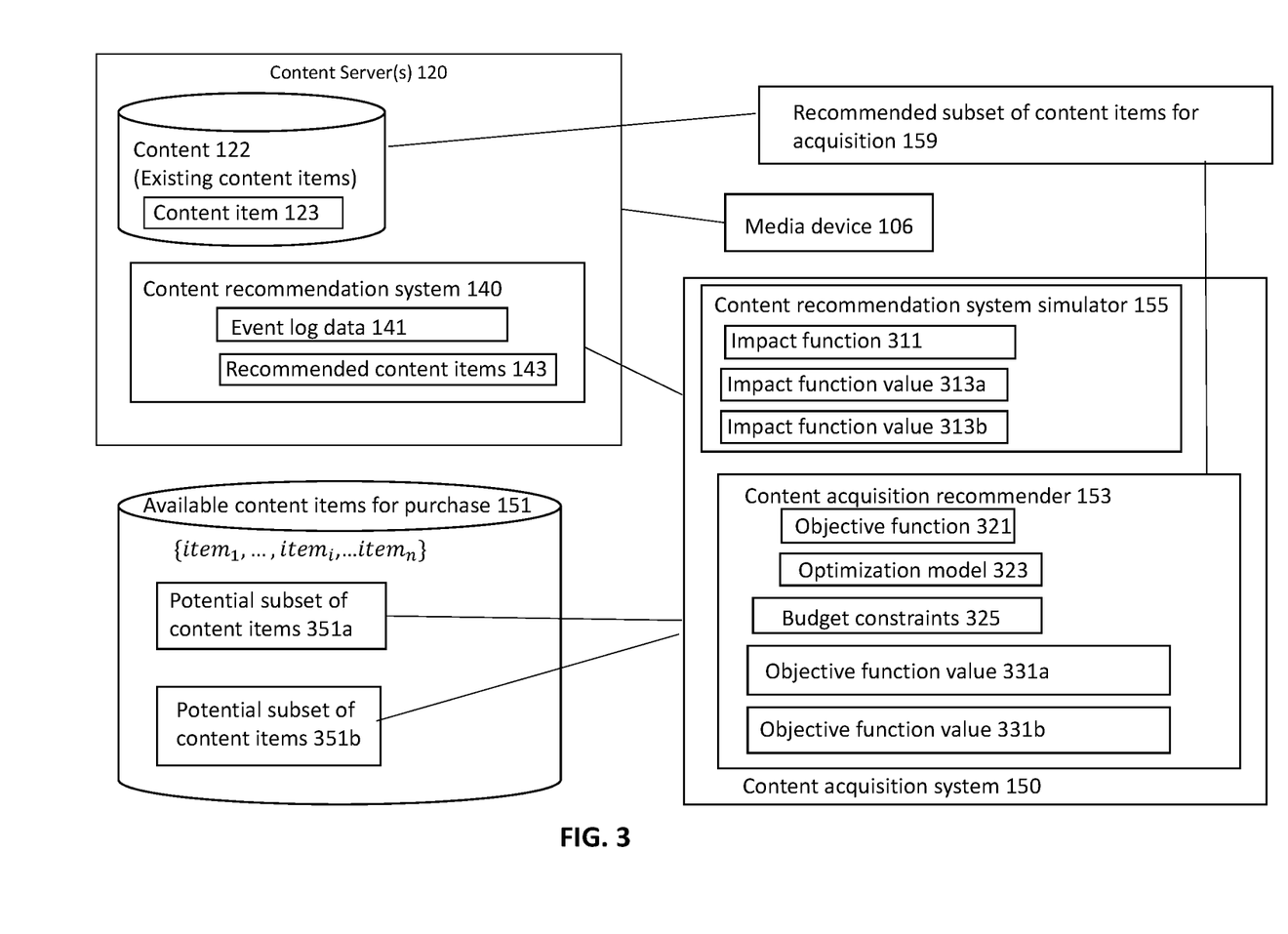
FIG. 3 illustrates an example diagram of a content acquisition system used in a multimedia environment, according to some embodiments.

FIG. 3 illustrates an example diagram of content acquisition system 150 used in multimedia environment 102, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 3, as will be understood by a person of ordinary skill in the art.

In some embodiments, content server 120 can include content 122 that contain content items 123, which are existing content items of multimedia environment 102. Content server 120 can also implement content recommendation system 140. Content recommendation system 140 may determine the set of recommended content items 143 based on event log data 141, and recommend the set of recommended content items 143 to user 132. Content acquisition system 150 can determine additional or new content items, which can be recommended subset of content items for acquisition 159 to be purchased. Recommended subset of content items for acquisition 159 can be purchased from content producers and added to content 122 saved on content server 120. Content acquisition system 150 can include content recommendation system simulator 155 and content acquisition recommender 153. In some embodiments, content acquisition system 150 may be implemented by content server 120, media device 106, or a device different from content server 120 and media device 106, individually or in combination.

In some embodiments, media devices 106 may exist in thousands or millions of media systems 104. Accordingly, media devices 106 may lend themselves to content acquisition solution embodiments. In some embodiments, an over-the-top (OTT) media device or service may benefit from the embodiments disclosed herein. An OTT media service is a media service offered directly to viewers via the Internet. OTT bypasses cable, broadcast, and satellite television platforms; the types of companies that traditionally act as controllers or distributors of such content. The term is most synonymous with subscription-based video-on-demand (SVoD) services that offer access to film and television content (including existing series acquired from other producers, as well as original content produced specifically for the service).

OTT also encompasses a wave of "skinny" television services that offer access to live streams of linear specialty channels, similar to a traditional satellite or cable TV provider, but streamed over the public Internet, rather than a closed, private network with proprietary equipment such as set-top boxes. Over-the-top services are typically accessed via websites on personal computers, as well as via apps on mobile devices (such as smartphones and tablets), digital media players (including video game consoles), or televisions with integrated Smart TV platforms.

In some embodiments, content recommendation system 140, content acquisition system 150, or content acquisition recommender 153 can all be a recommender system, or a recommendation system. Such a recommendation system can be a subclass of information filtering system that seeks to predict the "rating" or "preference" a user would give to an item. The embodiments described herein may use any recommendation system, algorithm or models without departing from the scope of the technology described herein. A few commonly used systems will be described hereafter, but other approaches, including future approaches may be interchanged herein without departing from the scope of the technology described.

Recommendation systems, such as content recommendation system 140, content acquisition recommender 153, or content acquisition system 150, can be used in a variety of areas, with commonly recognized examples taking the form of playlist generators for movies, series, documentaries, podcasts, music services, and product recommendations, to name a few. In some embodiments, the playlist may be instantiated as a series of visual tiles arranged in a row or multiple rows displaying a sample image of the content or selectable movie trailer. The tiles may be arranged by some selected ordering system (e.g., popularity) and may be arranged in groups or categories, such as "trending", "top 10", "newly added", "sports", "action", etc.

One approach to the design of recommendation systems that has wide use is collaborative filtering. Collaborative filtering is based on the assumption that people who agreed in the past will agree in the future, and that they will like similar kinds of items as they liked in the past. The recommendation system generates recommendations using only information about rating profiles for different users or items. Collaborative filtering methods may be classified as memory-based and model-based. A well-known example of memory-based approaches is the user-based algorithm, while that of model-based approaches is the Kernel-Mapping Recommender.

A key advantage of the collaborative filtering approach is that it does not rely on machine analyzable content and therefore it is capable of accurately recommending complex items such as movies without requiring an "understanding" of the item itself many algorithms have been used in measuring user similarity or item similarity in recommender systems. When building a model from a user's behavior, a distinction is often made between explicit and implicit forms of data collection. An example of explicit data collection may include asking a user to rate an item. While examples of implicit data collection may include observing the items that a user views, analyzing item/user viewing times, keeping a record of content items that a user purchases, or building a list of items that a user has watched on one or more streaming platforms.

Another common approach when designing recommendation systems is content-based filtering. Content-based filtering methods are based on a description of the item and a profile of the user's preferences. These methods are best suited to situations where there is known data on an item (name, location, description, etc.), but not on the user. Recommendation systems using content-based filtering can treat recommendations as a user-specific classification problem and learn a classifier for the user's likes and dislikes based on an item's features.

In a recommendation system using content-based filtering, keywords can be used to describe the items, and a user profile is built to indicate the type of item this user likes. In other words, these algorithms try to recommend items similar to those that a user liked in the past or is examining in the present. It does not rely on a user sign-in mechanism to generate this often temporary profile. In particular, various candidate items are compared with items previously rated by the user, and the best-matching items are recommended.

Basically, these various methods use an item profile (i.e., a set of discrete attributes and features) characterizing the item within the system. To abstract the features of the items in the system, an item presentation algorithm is applied. A widely used algorithm is the tf-idf representation (also called vector space representation). The system creates a content-based profile of users based on a weighted vector of item features. The weights denote the importance of each feature to the user and can be computed from individually rated content vectors using a variety of techniques. Simple approaches use the average values of the rated item vector, while other sophisticated methods use machine learning techniques, such as Bayesian Classifiers, cluster analysis, decision trees, and artificial neural networks in order to estimate the probability that the user is going to like the item.

Recommendation systems using content-based filtering can also include opinion-based recommendation systems. In some cases, users are allowed to leave movie reviews or feedback on the items. Features extracted from the user-generated reviews may improve meta-data of content items. Sentiments extracted from the reviews can be seen as users' rating scores on the corresponding features. Common approaches of opinion-based recommendation systems utilize various techniques including machine learning, content recognition, facial recognition, sentiment analysis and deep learning as discussed in greater detail hereafter.

As previously described, recommendation systems may be at least partially implemented with machine learning systems. Machine learning includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. For supervised learning, the computer is presented with example inputs and their desired outputs and the goal is to learn a general rule that maps inputs to outputs. However, a customer streaming selection of a title from a new set of titles may depend on many factors such as: a user's interest distribution, recommendation models (e.g., row ranking, item ranking, candidate selection, etc.), similar items in the portfolio, etc. Therefore, in an exemplary embodiment, unsupervised learning may carry some technical advantages of flexibility for adapting to new titles, new recommendation models, new users, new target segmentations and new demographics, as they become available. Alternatively, a supervised learning model may be implemented by estimating a total impression for titles, predicting streaming or impressions for each title and then combining the results.

In some embodiments, even though content recommendation system 140, content acquisition system 150, and content acquisition recommender 153 are all recommendation systems, they are different recommendation systems performing different functions. Content recommendation system 140 makes recommendations for content items already stored in content server 120. On the other hand, content acquisition recommender 153 or content acquisition system 150 makes recommendations for content items not stored in content server 120, but are going to be purchased and stored into content server 120.

In some embodiments, content acquisition system 150 can include content recommendation system simulator 155 and content acquisition recommender 153, one or both can be implemented by hardware or software components. In some embodiments, content acquisition system 150 can perform operations as illustrated in FIG. 4.

In some embodiments, content acquisition system 150 can receive a set of content items for potential acquisition, which can be the available content items for purchase 151, or simply referred to as a first set of content items.

Figure 4:
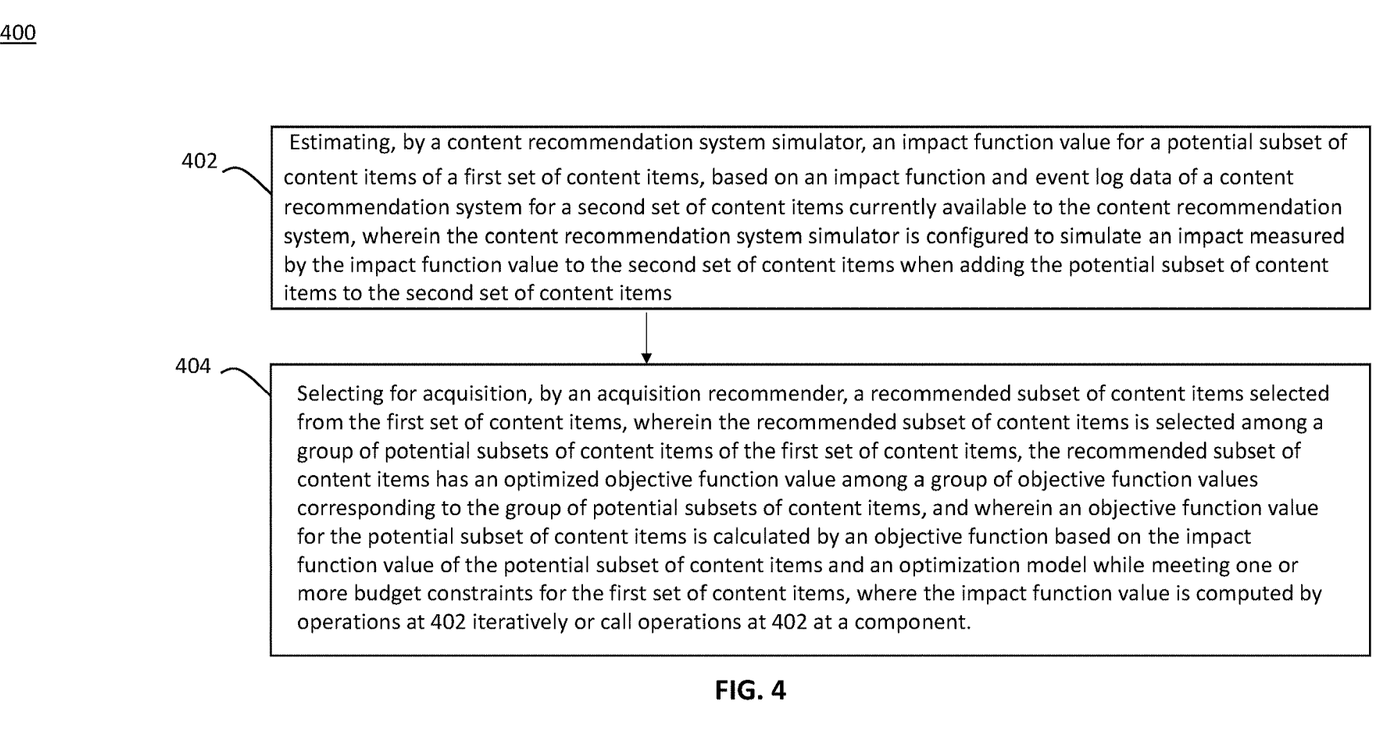
FIG. 4 illustrates an example process for content acquisition system, according to some embodiments.

In some embodiments, at 402 shown in FIG. 4, content recommendation system simulator 155 can estimate an impact function value for a potential subset of content items of the first set of content items, based on an impact function and event log data of a content recommendation system for a second set of content items currently available to the content recommendation system. For example, as shown in FIG. 3, the available content items for purchase 151 can include a potential subset of content items 351*a* and a potential subset of content items 351*b*. Content recommendation system simulator 155 can estimate an impact function value 313a for potential subset of content items 351a, and estimate an impact function value 313b for potential subset of content items 351b. Impact function value 313a and impact function value 313b are obtained based on an impact function 311 and event log data 141 of content recommendation system 140 for content items 123 currently available to content recommendation system 140. Content recommendation system simulator 155 can simulate an impact measured by impact function value 313a to content items 123 when adding potential subset of content items 351a to content items 123, and simulate an impact measured by impact function value 313b to content items 123 when adding potential subset of content items 351b to content items 123.

In some embodiments, event log data 141 can include data about a viewing history of content items 123 currently available to content recommendation system 140 by a group of users or viewers over a period of time, such as one week, one month, or one year.

In some embodiments, impact function value 313a for potential subset of content items 351a can include an estimated incremental streaming time for potential subset of content items 351a, an estimated incremental reach for potential subset of content items 351a, an estimated streaming time for potential subset of content items 351a, or an estimated reach for potential subset of content items 351a. Similarly, impact function value 313b for potential subset of content items 351b can include an estimated incremental streaming time for potential subset of content items 351b, an estimated incremental reach for potential subset of content items 351b, an estimated streaming time for potential subset of content items 351b, or an estimated reach for potential subset of content items 351b.

In some embodiments, at 404 shown in FIG. 4, content acquisition recommender 153 can select for acquisition a recommended subset of content items selected from the first set of content items. The recommended subset of content items can be selected among a group of potential subsets of content items of the first set of content items. The recommended subset of content items has an optimized objective function value among a group of objective function values corresponding to the group of potential subsets of content items. An objective function value for the potential subset of content items can be calculated by an objective function based on the impact function value of the potential subset of content items and an optimization model while meeting one or more budget constraints for the first set of content items. The impact function value can be computed by operations at 402 iteratively or call operations at 402 at a component.

In some embodiments, as shown in FIG. 3, content acquisition recommender 153 can select for acquisition recommended subset of content items for acquisition 159, which is selected from the first set of content items.

Recommended subset of content items for acquisition 159 can be selected among a group of potential subsets of content items of the first set of content items, such as among potential subset of content items 351a, potential subset of content items 351b, and other potential subsets. Recommended subset of content items for acquisition 159 has an optimized objective function value among a group of objective function values corresponding to the group of potential subsets of content items. For example, potential subset of content items 351a can have an objective function value 331a, which is calculated by an objective function 321 based on the impact function value 313a of potential subset of content items 351a and an optimization model 323 while meeting one or more budget constraints 325 for the first set of content items. Similarly, potential subset of content items 351b can have an objective function value 331b, which is calculated by objective function 321 based on impact function value 313b of potential subset of content items 351b and optimization model 323 while meeting one or more budget constraints 325 for the first set of content items. Recommended subset of content items for acquisition 159 can be selected as potential subset of content items 351a when potential subset of content items 351a has an optimized objective function value among a group of objective function values corresponding to the group of potential subsets of content items. For example, potential subset of content items 351a has an objective function value 331a that is the highest among a group of objective function values corresponding to the group of potential subsets of content items, including objective function value 331b of potential subset of content items 351b.

In some embodiments, additional operations may be performed by content acquisition system 150. For example, content recommendation system simulator 155 can estimate an impact function value associated with a user demographics bucket for the recommended subset of content items for acquisition 159, and determine to distribute the recommended subset of content items for acquisition 159 to users of the user demographics bucket after the recommended subset of content items have been purchased. The user demographics bucket may be classified by an age group, such as 14-25 years old, or age-location group such as 14-25 years old in New York city, or any other user demographics bucket.

In some embodiments, objective function value 331a for potential subset of content items 351a can include an expected streaming time for potential subset of content items 351a or an expected reach for potential subset of content items 351a. Similarly, objective function value 331b for potential subset of content items 351b can include an expected streaming time for potential subset of content items 351b or an expected reach for potential subset of content items 351b. Objective function 321 may depend on a parameter alpha ($\alpha$) as a weight to balance an estimated stream time for a content item $item_i$ and an estimated reach for the content item $item_i$, $\alpha ST(item_i)+(1-\alpha)R(item_i)$, wherein $ST(item_i)$ is the estimated stream time for a content item $item_i$, and $R(item_i)$ is the estimated reach for the content item $item_i$.

In some embodiments, the one or more budget constraints 325 can include $c_0 x_0 + \ldots + c_n x_n \leq B$, where B is a total budget, and $c_0, \ldots, c_n$ is a cost for a content item $item_i$, $x_0, \ldots, x_n$ has a value 0 or 1, where $item_i$ can be an item of the available content items for purchase 151, and the number n is the total number of content items in the available content items for purchase 151.

In some embodiments, optimization model 323 can include an integer programming model, a genetic algorithm model, or an iterated set merging algorithm model.

In some embodiments, content acquisition recommender 153 can have optimization model 323 including an integer programming model, and objective function 321 is to maximize $v_0 x_0 + \ldots + v_n x_n$, where $v_i = \alpha ST(item_i)+(1-\alpha)R(item_i)$, $ST(item_i)$ is an estimated stream time for a content item $item_i$, and $R(item_i)$ is an estimated reach for the content item $item_i$. Content acquisition recommender 153 can apply integer programming model on the 0-1 Knapsack Problem to determine recommended subset of content items for acquisition 159 having an optimized objective function value among a group of objective function values corresponding to the group of potential subsets of content items.

In some embodiments, the available content items for purchase 151 can include movies or TV show content items. Recommended subset of content items for acquisition 159 can be determined to maximize expected streaming time and reach of the set of content items while satisfying budget constraint 325, which can be modelled as the following integer programming formulas:

Maximize $\Sigma_{i=1}^{n} v_i x_i$, subject to $\Sigma_{i=1} c_i x_i \leq B$, $x_i \in \{0,1\}$,
$B$ is the budget, and $v_i = \alpha ST(item_i) + (1-\alpha)R$
$(item_i)$, $\alpha \in [0,1]$.

In some embodiments, parameter $\alpha$ can be a constant in the range between [0,1] defined to balance the objective between maximizing streaming time and maximizing reach. When $\alpha$ is zero, objective function 321 is to optimize just the streaming time. When $\alpha$ is one, objective function 321 is to optimize just the reach. The larger the parameter $\alpha$, the higher the weight the objective function 321 gives to reach instead of streaming time. As mentioned above, ST($item_i$) is the expected streaming time for $item_i$ and R($item_i$) is the expected reach for $item_i$, both of them could be predicted by machine learning models. Although, the Knapsack problem is NP-hard problem, it can be solved by integer programming solver and dynamic programing for small and medium size problem.

In some embodiments, content acquisition recommender 153 can have optimization model 323 including a genetic algorithm model, which can be used to find the near optimal new item set to maximize incremental streaming time and reach while satisfying the budget constraint. When optimization model 323 includes a genetic algorithm model, objective function 321 can be a fitness function for a set Q defined as Fit(Q)=[$\alpha$ST(Q)+(1-$\alpha$)R(Q)-$\beta$I(C(Q)-B)]/C(Q), where $\beta$ is a positive number, I(x)=x, if x>0, and I(x)=0, if x≤0.

Assuming the available content items for purchase 151 has N new content items $item_i$, 1<=i<=N, and the number N is the total number of content items in the available content items for purchase 151. A chromosome Q can represent each possible candidate set, which can be defined by $$b_i = \begin{cases} 1, \text{ if } item_i \in Q \\ 0, \text{ if } item_i \notin Q \end{cases}, \text{ and } Q = \{b_1, \ldots, b_i, \ldots b_N\}.$$

Objective function 321 can be defined by the fitness function for the chromosome mapped from set Q:

Fit(Q)=[$\alpha$ST(Q)+(1-$\alpha$)R(Q)-$\beta$I(C(Q)-B]/C(Q),where
$\alpha \in [0,1], \beta \geq 0$, C(Q) is the total cost on set Q, B is the total budget, and $$I(x) = \begin{cases} 1, \text{ if } item_i \in Q \\ 0, \text{ if } item_i \notin Q \end{cases}.$$

In some embodiments, content acquisition recommender 153 can optimize both streaming time and reach and the parameter a is the weight to balance them, while the parameter $\beta$ decides how much penalty to be imposed if the cost of the set of items is over budget.

In some embodiments, the detailed genetic algorithm used by content acquisition recommender 153 for determining recommended subset of content items for acquisition 159 can be described in the following:

1. Set population size as POP, and total number of Generation as GEN
2. Generate initial POP number of set $Q_1, Q_2, \ldots, Q_{POP}$
3. Map generated set to chromosome $C_1, C_2, \ldots, C_{POP}$
4. For i=1 to Gen
    a. generate Fitness score Fit ($C_i \rightarrow Q_i$) based on the Recommendation system simulator 155 and the equation for Fit (Q) defined above;
    b. select top POP chromosome based on their Fitness score
    c. perform crossover operator on selected parents to generate K offspring chromosomes
    d. perform mutation operator to generate J offspring chromosomes
    e. record overall top K chromosome based fitness function Fit (Q)
5. EndFor
6. Mapping the top K chromosome to top K set of items and output them as the recommended subset of content items for acquisition 159.

In some embodiments, content acquisition recommender 153 can have optimization model 323 including an iterated set merging algorithm model, and the objective function is a fitness function for a set Q defined as V(Q)=[$\alpha$ST(Q)+(1-$\alpha$)R(Q)]/C(Q), where C(Q) is a total cost for the set Q.

Assuming the available content items for purchase 151 has N new content items $item_i$, 1<=i<=N, and the number N is the total number of content items in the available content items for purchase 151. Content acquisition recommender 153 can initialize N sets as T, each set with only one item for $item_1, \ldots item_i, \ldots item_N$. In each iteration, content acquisition recommender 153 can randomly merge two set for K and evaluate them with content recommendation system simulator 155 and add to T. T is the entire set of potential content acquisition sets, for example, for 3 contents A, B, C, T could be {{A,B}, {A, C}, {B,C}, {A,B,C}, {C}, {A}, {B}}. After M iteration, content acquisition recommender 153 can pick up the top K sets according to value function defined as V (Q)=[$\alpha$ST(Q)+(1-$\alpha$)R(Q)]/C(Q), where $\alpha \in$ [0,1] for a set Q, Q represents any set of items, and K represents how many different sets are merged in each iteration of the set merging algorithm.

To explore more potential merging candidates, a machine learning model can be build to predict combined streaming time ST and reach R when two sets Q and P are merged, as follows:

ST(Q∪P)=$f_1$(ST(Q),ST(P),SIM(Q,P))

R(Q∪P)=$f_2$(ST(Q),ST(P),SIM(Q,P))

where SIM(Q,P) are features developed based on similarity between set Q and P, where $f_1$ and $f_2$ are machine learning models.

The detailed algorithm is listed in the following:
1. Build the initial set of sets T as N sets contains single $item_1$ for $item_1$ to $item_N$, when C($item_i$))<=B, set total iteration to run as M, and the number of new set to generate as H, number of new set to pick up as G.
2. For a set Q in T
    a. using content recommendation system simulator 155 to estimate streaming time ST(Q) and reach R(Q) for set Q
    b. calculate V (Q) based on equation above for V (Q).
3. EndFor
4. For i=1 to M
    a. For j=1 to H
        i. randomly select sets Q, P in T with total budget less than B
        ii. combine sets Q, P as new set W iii. estimate ST_e(W) and R_e(W) with machine learning model $f_1$ and $f_2$, where ST_e(W) and R_e(W) are generated by model $f_1$ and $f_2$ to predict ST and R for set of items W
iv. calculate V_e(W) based on equation above for V (Q).
b. EndFor
c. Pick up top G set from H based on the V_e(W) as set Z (note, the limit for sets can be set with size E as E^2*R, where R is a constant here)
d. For j=1 to G
i. use content recommendation system simulator 155 to evaluate the set Z_i to get ST(Z_i) and R(Z_i)
ii. calculate V(Z_i) based on equation above for V (Q)
e. EndFor
f. Merge set Z into set T
g. record overall top K set based on value V
5. EndFor
6. Output top K sets and their V value, ST (streaming time) and R (reach) as the recommended subset of content items for acquisition 159.

In some embodiments, ST_e(W) and R_e(W) generated by model $f_1$ and $f_2$ can be faster than than running simulator, however results could be less accurate there.

Figure 5:
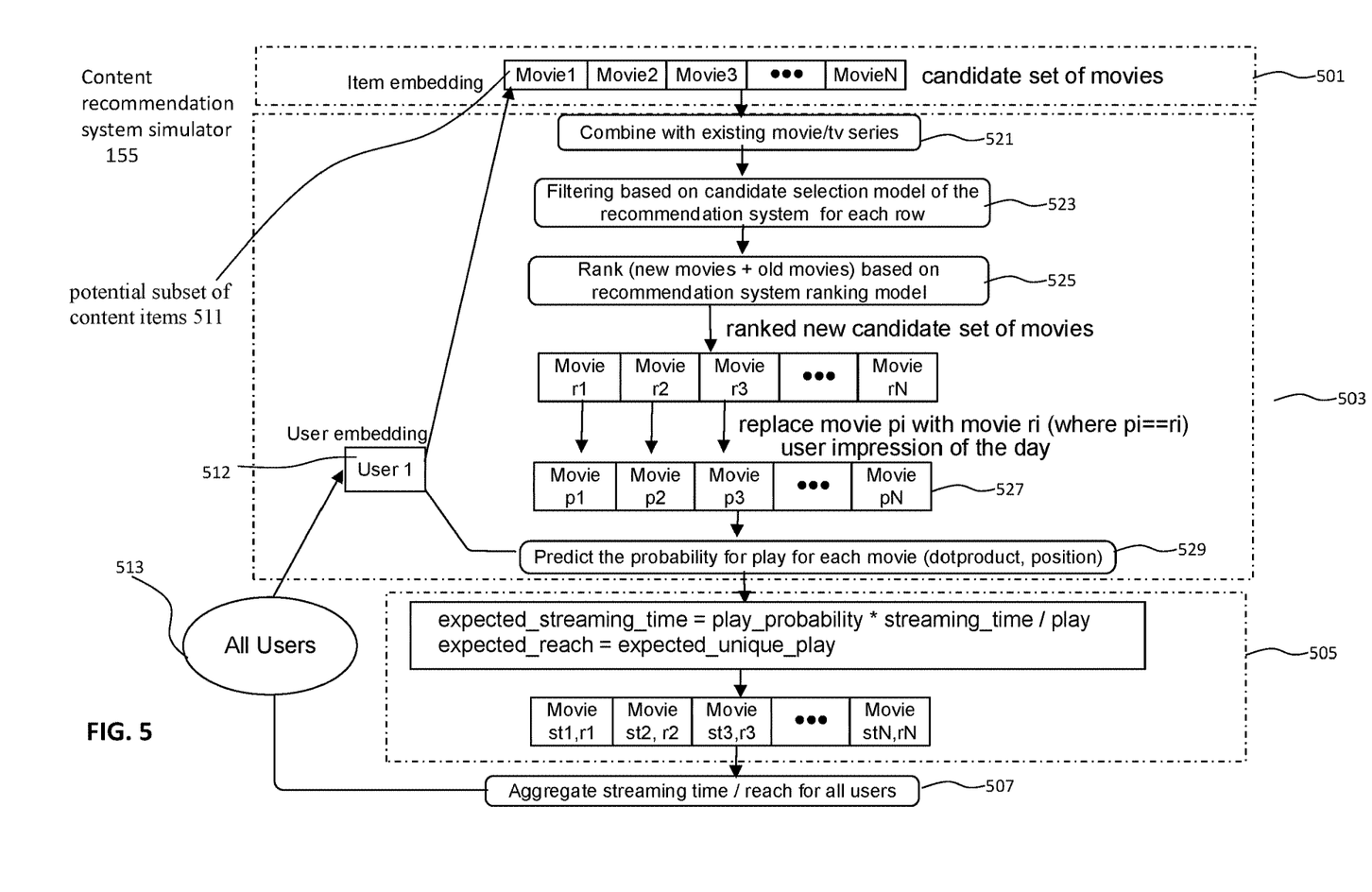
FIG. 5 illustrates an example diagram of a content recommendation system simulator used in a content acquisition system, according to some embodiments.

FIG. 5 illustrates an example diagram of content recommendation system simulator 155 used in content acquisition system 150, according to some embodiments.

When potential subset of content items 351a or 351b are added to content 122 of content server 120, similar content items, such as movies or TV series items may affect each other's ranking and streaming time, as well as their reach. Potential subset of content items 351a or 351b may be referred to as a new content item set. It is difficult in predicting streaming time and reach accurately even for just a single content item, as the streaming and reach depends not only on the content item's popularity, but also on how many users like the content item or the users interest distribution, and how well the new content item ranked among existing content items by the content recommendation system for users. Content recommendation system simulator 155 can estimate metrics such as streaming time and reach by inserting the new content item or a set of content items into the current production content item set, e.g., content 122, and run back testing through event log data accumulated in past week or month.

In some embodiments, content recommendation system simulator 155 can estimate not only streaming time or reach on the new content item set, but also incremental streaming time and reach when adding the new content item set to current content items accessible by content recommendation system 140. Accordingly, when a new content item set with high streaming or reach is added to current content items, if the new content item set has a large overlap with the current top content items, content recommendation system simulator 155 can determine the new content item set may not achieve expected gain on streaming time or reach. In addition, content recommendation system simulator 155 can estimate other metrics such as weighted reach across different age buckets.

At 501, content recommendation system simulator 155 can receive a potential subset of content items 511, which can include a candidate set of movies, such as movie 1, movie 2, . . . movie N. Potential subset of content items 511 may be an example of potential subset of content items 351a.

At 503, content recommendation system simulator 155 can determine, for a user 512 of a community of users 513 that can access the content recommendation system 140, a probability for display to the user each content item of the potential subset of content items 511 using the content recommendation system 140. Multiple steps of operations may implement operations at 503. For example, at 521, content recommendation system simulator 155 may combine the potential subset of content items 511 with existing content items 123. At 523, content recommendation system simulator 155 may filter based on candidate selection model of the recommendation system 140 for each row, which is a category of the recommendation system 140. At 525, content recommendation system simulator 155 may rank the content items of the potential subset of content items 511 and existing content items 123 based on a recommendation system ranking model. The ranked new candidate set of movies can be represented as Movie r1, Movie r2, . . . , Movie rN. At 527, content recommendation system simulator 155 may replace movie Pi with movie ri and rank the user impression of the day, shown as Movie p1, Movie p2, . . . , Movie pN, which are movies impressions stored in event data log. Movie p1, Movie p2, . . . , Movie pN can be replaced by the new ranking Movie r1, Movie r2, . . . , Movie rN and the expected streaming time and reach could be calculated accordingly. Finally, at 529, content recommendation system simulator 155 may calculate the probability for display to the user each content item of the potential subset of content items 511.

At 505, content recommendation system simulator 155 can determine an impact function value for the user based on the probability for display for each content item. As shown in FIG. 5, the impact function value may be an expected stream time (st1, . . . stN) or expected reach (r1, . . . , rN) calculated for each content item of potential subset of content items 511. For example, expected_streming_time=play_probability*streaming_time/play, and expected_reach=expected_unique_play, which are the number of plays by unique users or user accounts.

At 507, content recommendation system simulator 155 can determine the impact function value for the potential subset of content items by aggregating the impact function value for all users of the community of users.

The simulator will be implemented in spark and run distributed to estimate streaming time and reach in parallel for different new item sets. Note, the embedding of the new items can be retrieved from global item embedding built using search data. If we don't have search data on the new item, the embedding can be build based on the content data of the new item instead.

In some embodiments, content recommendation system simulator 155 may rely on past data such as event log data 141. In some other embodiments, a forward simulation can be performed instead, which may augment the current service with the new content items and send request to the new service based on sampled user requests to estimate different metrics on new item such as streaming and reach.

Example Computer System

Figure 6:
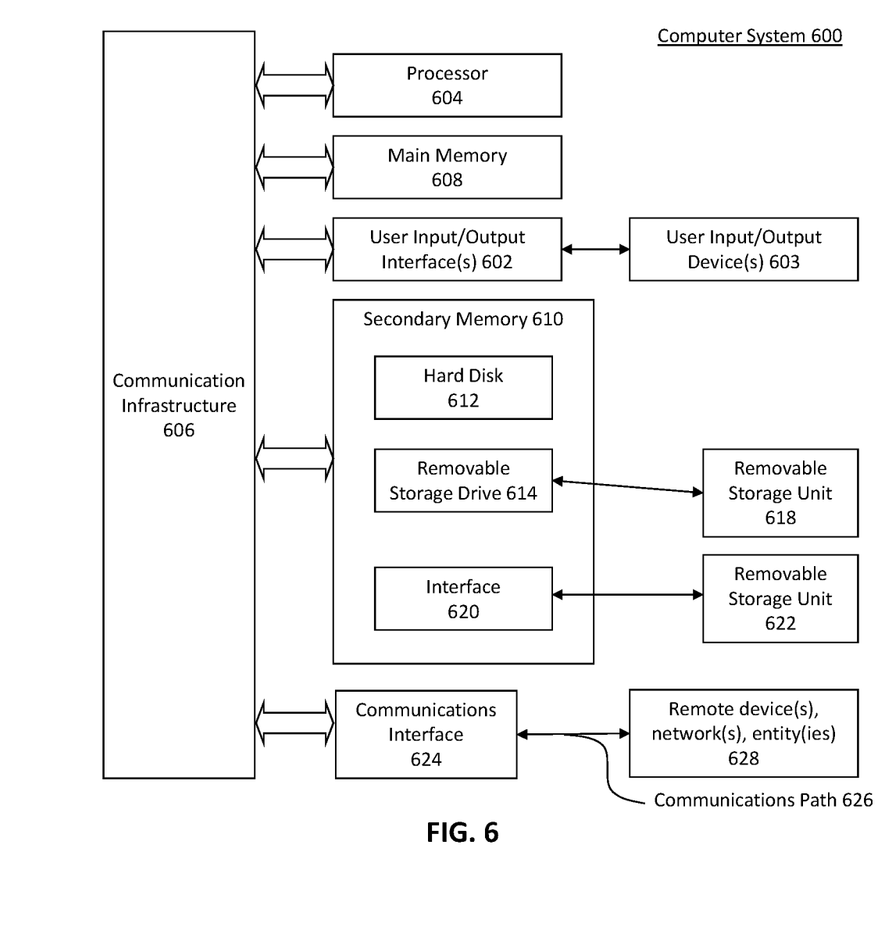
FIG. 6 illustrates an example computer system useful for implementing various embodiments.

Various embodiments may be implemented, for example, using one or more well-known computer systems, such as computer system 600 shown in FIG. 6. For example, media device 106, display device 108, content server 120, content acquisition system 150, may be implemented using combinations or sub-combinations of computer system 600 to perform various functions described herein, e.g., by process 400. Additionally or alternatively, one or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for content acquisition recommendation, the computer implemented method comprising:
    receiving a first set of content items for potential acquisition;
    estimating, by a content recommendation system simulator, an impact function value for a potential subset of content items of the first set of content items, based on an impact function and event log data of a content recommendation system for a second set of content items currently available to the content recommendation system, wherein the content recommendation system simulator is configured to simulate an impact measured by the impact function value to the second set of content items when adding the potential subset of content items to the second set of content items; and
    selecting for acquisition, by an acquisition recommender, a recommended subset of content items selected from the first set of content items, wherein the recommended subset of content items is selected among a group of potential subsets of content items of the first set of content items, the recommended subset of content items has an optimized objective function value among a group of objective function values corresponding to the group of potential subsets of content items, and wherein an objective function value for the potential subset of content items is calculated by an objective function based on the impact function value for the potential subset of content items and an optimization model while meeting one or more budget constraints for the first set of content items.

2. The computer implemented method of claim 1, wherein the impact function value for the potential subset of content items includes an estimated incremental streaming time for the potential subset of content items, an estimated incremental reach for the potential subset of content items, an estimated streaming time for the potential subset of content items, or an estimated reach for the potential subset of content items.

3. The computer implemented method of claim 1, wherein the objective function value for the potential subset of content items includes an expected streaming time for the potential subset of content items or an expected reach for the potential subset of content items.

4. The computer implemented method of claim 1, wherein the objective function depends on a parameter alpha ($\alpha$) as a weight to balance an estimated stream time for a content item $item_i$ and an estimated reach for the content item $item_i$, $\alpha ST(item_i)+(1-\alpha)R(item_i)$, wherein $ST(item_i)$ is the estimated stream time for the content item $item_i$, and $R(item_i)$ is the estimated reach for the content item $item_i$.

5. The computer implemented method of claim 1, wherein the one or more budget constraints includes $c_0 x_0 + \ldots + c_n x_n \leq B$, where B is a total budget, and $c_0, \ldots, c_n$ is a cost for a content item $item_i$, $x_0, \ldots, x_n$ has a value 0 or 1.

6. The computer implemented method of claim 1, wherein the event log data includes data about a viewing history of the second set of content items currently available to the content recommendation system by a group of users over a period of time.

7. The computer implemented method of claim 1, wherein the optimization model includes an integer programming model, a genetic algorithm model, or an iterated set merging algorithm model.

8. The computer implemented method of claim 1, wherein the optimization model includes an integer programming model, and the objective function is to maximize $v_0 x_0 + \ldots + v_n x_n$, where $v_i = \alpha ST(item_i)+(1-\alpha)R(item_i)$, $ST(item_i)$ is an estimated stream time for a content item $item_i$, and $R(item_i)$ is an estimated reach for the content item $item_i$.

9. The computer implemented method of claim 1, wherein the optimization model includes a genetic algorithm model, and the objective function is a fitness function for a set Q defined as $Fit(Q)=[\alpha ST(Q)+(1-\alpha)R(Q)-\beta I(C(Q)-B)]/C(Q)$, where $\beta$ is a positive number, $I(x)=x$, if $x>0$, and $I(x)=0$, if $x \leq 0$.

10. The computer implemented method of claim 1, wherein the optimization model includes an iterated set merging algorithm model, and the objective function is a fitness function for a set Q defined as $V(Q)=[\alpha ST(Q)+(1-\alpha)R(Q)]/C(Q)$, where $C(Q)$ is a total cost for the set Q.

11. The computer implemented method of claim 1, wherein the estimating, by the content recommendation system simulator, the impact function value for the potential subset of content items of the first set of content items comprises:
    determining, for a user of a community of users that can access the content recommendation system, a probability for display to the user each content item of the potential subset of content items using the content recommendation system;
    determining an impact function value for the user based on the probability for display for each content item; and determining the impact function value for the potential subset of content items by aggregating an impact function value for all users of the community of users.

12. The computer implemented method of claim 1, further comprising:
   estimating, by the content recommendation system simulator, an impact function value associated with a user demographics bucket for the recommended subset of content items; and
   determining to distribute the recommended subset of content items to users of the user demographics bucket after the recommended subset of content items have been purchased.

13. A content acquisition system, comprising:
   a content recommendation system simulator configured to estimate an impact function value for a potential subset of content items of a first set of content items, based on an impact function and event log data of a content recommendation system for a second set of content items currently available to the content recommendation system, wherein the content recommendation system simulator is configured to simulate an impact measured by the impact function value to the second set of content items when adding the potential subset of content items to the second set of content items; and
   an acquisition recommender configured to select for acquisition a recommended subset of content items selected from the first set of content items, wherein the recommended subset of content items is selected among a group of potential subsets of content items of the first set of content items, the recommended subset of content items has an optimized objective function value among a group of objective function values corresponding to the group of potential subsets of content items, and wherein an objective function value for the potential subset of content items is calculated by an objective function based on the impact function value of the potential subset of content items and an optimization model while meeting one or more budget constraints for the first set of content items.

14. The content acquisition system of claim 13, wherein the impact function value for the potential subset of content items includes an estimated incremental streaming time for the potential subset of content items, an estimated incremental reach for the potential subset of content items, an estimated streaming time for the potential subset of content items, or an estimated reach for the potential subset of content items.

15. The content acquisition system of claim 13, wherein the objective function value for the potential subset of content items includes an expected streaming time for the potential subset of content items or an expected reach for the potential subset of content items.

16. The content acquisition system of claim 13, wherein the objective function depends on a parameter alpha ($\alpha$) as a weight to balance an estimated stream time for a content item $item_i$ and an estimated reach for the content item $item_i$, $\alpha ST(item_i)+(1-\alpha)R(item_i)$, wherein $ST(item_i)$ is the estimated stream time for the content item $item_i$, and $R(item_i)$ is the estimated reach for the content item $item_i$.

17. The content acquisition system of claim 13, wherein the one or more budget constraints includes $c_0 x_0 + \ldots + c_n x_n \leq B$, where B is a total budget, and $c_0, \ldots, c_n$ is a cost for a content item $item_i$, $x_0, \ldots, x_n$ has a value 0 or 1.

18. The content acquisition system of claim 13, wherein the event log data includes data about a viewing history of the second set of content items currently available to the content recommendation system by a group of users over a period of time; and
   wherein the optimization model includes an integer programming model, a genetic algorithm model, or an iterated set merging algorithm model.

19. A non-transitory computer-readable medium having instructions stored thereon that, when executed by at least a computing device, cause the computing device to perform operations comprising:
   receiving a first set of content items for potential acquisition;
   estimating, by a content recommendation system simulator, an impact function value for a potential subset of content items of the first set of content items, based on an impact function and event log data of a content recommendation system for a second set of content items currently available to the content recommendation system, wherein the content recommendation system simulator is configured to simulate an impact measured by the impact function value to the second set of content items when adding the potential subset of content items to the second set of content items; and
   selecting for acquisition, by an acquisition recommender, a recommended subset of content items selected from the first set of content items, wherein the recommended subset of content items is selected among a group of potential subsets of content items of the first set of content items, the recommended subset of content items has an optimized objective function value among a group of objective function values corresponding to the group of potential subsets of content items, and wherein an objective function value for the potential subset of content items is calculated by an objective function based on the impact function value for the potential subset of content items and an optimization model while meeting one or more budget constraints for the first set of content items.

20. The non-transitory computer-readable medium of claim 19, wherein the impact function value for the potential subset of content items includes an estimated incremental streaming time for the potential subset of content items, an estimated incremental reach for the potential subset of content items, an estimated streaming time for the potential subset of content items, or an estimated reach for the potential subset of content items; and
   wherein the objective function value for the potential subset of content items includes an expected streaming time for the potential subset of content items or an expected reach for the potential subset of content items.

* * * * *

UNITED STATES PATENT AND TRADEMARK OFFICE
CERTIFICATE OF CORRECTION

| | |
|---|---|
| PATENT NO. | : 12,126,874 B2 |
| APPLICATION NO. | : 18/091234 |
| DATED | : October 22, 2024 |
| INVENTOR(S) | : Xiao et al. |

It is certified that error appears in the above-identified patent and that said Letters Patent is hereby corrected as shown below:

In the Specification

In Column 3, Line 60, delete "$\tau_{i \in S}$" and insert -- $\sum_{i \in S}$ --, therefor.

In Column 7, Line 28, delete "(wmy," and insert -- (wmv, --, therefor.

In Column 9, Line 24, delete "itself many" and insert -- itself. Many --, therefor.

In Column 13, Line 10, delete "$\sum_{i=1}$" and insert -- $\sum_{i=1}^{n}$ --, therefor.

In Column 13, Line 59, delete "a" and insert -- α --, therefor.

In Column 14, Line 54, delete "item$_1$" and insert -- item, --, therefor.

In Column 15, Line 25, delete "than than" and insert -- than --, therefor.

In Column 16, Line 36, delete "streming" and insert -- streaming_ --, therefor.

In Column 17, Line 38, delete "and/any" and insert -- and/or any --, therefor.

Signed and Sealed this
Third Day of December, 2024

Katherine Kelly Vidal
*Director of the United States Patent and Trademark Office*